United States Patent
Han et al.

(10) Patent No.: US 9,461,856 B2
(45) Date of Patent: Oct. 4, 2016

(54) DEVICE AND METHOD FOR TRANSMITTING DOWNLINK CONTROL INFORMATION IN A WIRELESS COMMUNICATION SYSTEM

(75) Inventors: Jin Kyu Han, Seoul (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1111 days.

(21) Appl. No.: 12/610,849

(22) Filed: Nov. 2, 2009

(65) Prior Publication Data
US 2010/0111107 A1 May 6, 2010

(30) Foreign Application Priority Data
Oct. 31, 2008 (KR) .................. 10-2008-0107684

(51) Int. Cl.
| | | |
|---|---|---|
| H04L 1/00 | (2006.01) | |
| H04L 27/26 | (2006.01) | |
| H04L 1/18 | (2006.01) | |
| H04L 5/00 | (2006.01) | |

(52) U.S. Cl.
CPC ......... H04L 27/2602 (2013.01); H04L 1/0038 (2013.01); *H04L 1/0003* (2013.01); *H04L 1/1812* (2013.01); *H04L 5/0053* (2013.01); *H04L 5/0091* (2013.01)

(58) Field of Classification Search
USPC ........................................ 370/472
See application file for complete search history.

(56) References Cited

U.S. PATENT DOCUMENTS

| | | | |
|---|---|---|---|
| 2003/0174677 A1* | 9/2003 | Mantha .................... | 370/335 |
| 2007/0143655 A1 | 6/2007 | Niu et al. | |
| 2007/0211718 A1 | 9/2007 | Kang et al. | |
| 2007/0293172 A1* | 12/2007 | Shi ............... | H04B 7/0634 455/187.1 |
| 2009/0088148 A1* | 4/2009 | Chung et al. ............ | 455/423 |
| 2009/0257449 A1* | 10/2009 | Chen et al. .............. | 370/470 |
| 2010/0111107 A1* | 5/2010 | Han .............. | H04L 1/0038 370/472 |
| 2011/0083066 A1* | 4/2011 | Chung et al. ............ | 714/807 |

FOREIGN PATENT DOCUMENTS

| | | |
|---|---|---|
| CN | 1852042 | 10/2006 |
| JP | 2007-505571 | 3/2007 |
| KR | 1020050070087 | 7/2005 |
| WO | WO 2004/039027 | 5/2004 |
| WO | WO 2005/027371 | 3/2005 |

OTHER PUBLICATIONS

3GPP TSG-RAN WG1 #54 (3GPP), "Additional details on confusing multiple PDCCH aggregation levels", Aug. 2008, pp. 5-6.*

(Continued)

*Primary Examiner* — Adnan Baig
(74) *Attorney, Agent, or Firm* — The Farrell Law Firm, P.C.

(57) ABSTRACT

A Downlink Control Information (DCI) processing device and method for a wireless communication system that encodes/decodes downlink control information based on a payload size of DCI format. The method includes determining a payload size of a first DCI format; and determining a payload size of a second DCI format by appending padding bits to the second DCI format until the payload size of the second DCI format is not an ambiguous size and is not equal to the payload size of the first DCI format.

16 Claims, 5 Drawing Sheets

(56) References Cited

OTHER PUBLICATIONS

Qualcomm Europe: "Additional Details on Confusing Multiple PDCCH Aggregation Levels", 3GPP TSG-RAN WG1 #54, R1-083169, Aug. 18, 2008.

Ericsson: "Summary of Email Discussion on DL Control Signaling", TSG-RAN WG1 #52bis, R1-081522, Mar. 31, 2008.

Qualcomm Europe: "Confusing Multiple PDCCH Aggregation Levels", 3GPP TSG-RAN WG1 #53bis, R1-082544, Jun. 30, 2008.

* cited by examiner

DEVICE AND METHOD FOR TRANSMITTING DOWNLINK CONTROL INFORMATION IN A WIRELESS COMMUNICATION SYSTEM

PRIORITY

This application claims priority to an application filed in the Korean Intellectual Property Office on Oct. 31, 2008 and assigned Serial No. 10-2008-0107684, the content of which is incorporated herein by reference.

BACKGROUND OF THE INVENTION

1. Field of the Invention

The present invention relates generally to a wireless communication system and, in particular, to a device and method for transmitting downlink control information in a wireless communication system in which the control information including downlink data transmission information, uplink resource allocation information, and transmission power control information is carried by a Physical Downlink Control Channel (PDCCH).

2. Description of the Related Art

In Long Term Evolution (LTE), multiple Downlink Control Information (DCI) formats are specified to support various transmission modes, and a User Equipment (UE) decodes the DCI using a blind decoding, wherein the DCI format type is determined by the size of the DCI format payload, rather than from any format identifier. Accordingly, the DCI formats have different sizes of payloads. The DCI formats include format 0, format 1, format 1A, etc. Therefore, when the DCI formats have the same size payload, the UE may fail to identify the DCI format correctly, and subsequently cannot decode the DCI.

In a conventional method for determining the payload size, the payload sizes of the DCI format 0 ($N_0$) and DCI format 1A ($N_{1A}$) are first determined and then the payload size of the DCI format 1 ($N_1$) is determined. The payload size of the DCI format 1 is determined depending on the downlink bandwidth (i.e., a number of Resource Blocks (RBs)) and duplex mode, and by excluding padding bits and 16-bit UE identifier.

The DCI format 1 must have a payload size different from that of the DCI format 0/1A. If the number of information bits in DCI format 1 is equal to that in the DCI format 0/1A, a padding bit is appended to the DCI format 1 so as to update the $N_1 = N_1 + 1$.

However, if the updated payload size of the DCI format 1 is an ambiguous size, another padding bit is appended to the DCI format 1 and $N_{1A}$ is incremented by 1. If the payload size of the DCI format 1 is not an ambiguous size, no further padding bits are necessary, and the payload size $N_1$ of the DCI format 1 is determined.

However, the conventional DCI format 1 payload size determination method has a drawback in that the payload size of the DCI format 1 can be equal to that of another DCI format. As described above, a padding bit is appended to the DCI format 1 to differentiate the payload size of the DCI format 1 from that of the DCI format 0/1A, and another padding bit is further appended to the DCI format 1 such that the payload size of the DCI format 1 is not an ambiguous size. Therefore, although the payload size $N_1$ of the DCI format is differentiated from payload size $N_0$ of the DCI format 0, they may end up being equal to each other as a result of appending the padding bit to avoid the payload size $N_1$ from belonging an ambiguous size.

For example, assuming that $N_0$ and $N_1$ have a relationship of $N_1 = N_0 - 1$, the padding bit addition step is skipped because $N_0$ and $N_1$ have different values and, consequently, the relationship of $N_1 = N_0 - 1$ is maintained. However, if $N_1$ is an ambiguous size, a padding bit subsequently is appended to the DCI format 1 such that the $N_1$ increments by 1 ($N_1 + 1$), resulting in $N_0 = N_1$.

Such a problem occurs when $N_{RB}^{DL} = 30$ and $N_{RB}^{UL} = 6$ in a Frequency Division Duplexing (FDD) mode. In this situation, the payload size of both the DCI format 0 and DCI format 1A is 25 bits and the payload size of the DCI format 1 is also 25 bits. Because the DCI format 1 cannot be differentiated from the DCI format 0/1A, based on the payload size, the UE fails to differentiate the two DCI formats in such a problematic situation, and Physical Downlink Control Channel (PDCCH) decoding fails.

SUMMARY OF THE INVENTION

In order to address at least the above-described problems of the prior art, in accordance with an embodiment of the present invention, a device and method are provided for transmitting downlink control information in a wireless communication system that is capable of differentiating payload sizes of different DCI formats from each other by introducing an improved padding bit addition algorithm.

Further, a device and method are provided for transmitting downlink control information in a wireless communication system that is capable of differentiating a payload size of a DCI format 1 from a payload size of the preset DCI format 0/1A.

In accordance with an embodiment of the present invention, a Downlink Control Information (DCI) processing method for a wireless communication system in which DCI is encoded/decoded based on a payload size of a DCI format is provided. The method includes determining a payload size of a first type DCI format; and determining a payload size of a second type DCI format by appending one or more padding bits to the second type DCI format, until the payload size of the second type DCI format does is not an ambiguous size and is not equal to the payload size of the first type DCI format.

In accordance with another embodiment of the present invention, a Downlink Control Information (DCI) processing method for wireless communication system in which downlink control information is encoded/decoded based on a payload size of DCI format is provided. The method includes calculating a payload size of a DCI format 1, by configuring a payload size of the DCI format 1 depending on a downlink bandwidth and a duplex mode, differentiating, when the payload size of the DCI format 1 is equal to a payload size of a DCI format 1A/0, the payload size of the DCI format 1 from the payload size of the DCI format 1A/0 by appending one padding bit to the DCI format 1, and determining, when the payload size of the DCI format 1 differentiated from the payload size of the DCI format 1A/0 is an ambiguous size, the payload size of the DCI format 1 by appending padding bits to the DCI format 1 until the payload size of the DCI format 1 is not an ambiguous size; generating a payload of a downlink control channel according to the calculated payload size of the DCI format 1; encoding the payload of the DCI format 1; and transmitting encoded payload of the DCI format 1 on the downlink control channel.

In accordance with another embodiment of the present invention, a control channel data reception method for a wireless communication system in which downlink control information is encoded/decoded based on a payload size of DCI format is provided. The method includes calculating a payload size of a DCI format 1 by configuring a payload size of the DCI format 1 depending on a downlink bandwidth and a duplex mode, differentiating, when the payload size of the DCI format 1 is equal to a payload size of a DCI format 1A/0, the payload size of the DCI format 1 from the payload size of the DCI format 1A/0 by appending a padding bit to the DCI format 1, and determining, when the payload size of the DCI format 1 differentiated from the payload size of the DCI format 1A/0 is an ambiguous size, the payload size of the DCI format 1 by appending padding bits to the DCI format 1 until the payload size of the DCI format 1 is not an ambiguous size; demapping and demodulating data of the downlink control channel; and blind-decoding the demodulated data of the downlink control channel in units of the calculated payload size of the DCI format.

In accordance with another embodiment of the present invention, a Downlink Control Information (DCI) transmission device for a wireless communication system in which downlink control information is encoded/decoded based on a payload size of DCI format is provided. The device includes a payload size calculator that configures a payload size of a DCI format 1 depending on a downlink bandwidth and a duplex mode, differentiates, when the payload size of the DCI format 1 is equal to a payload size of a DCI format 1A/0, the payload size of the DCI format 1 from the payload size of the DCI format 1A/0 by appending a padding bit to the DCI format 1, determines, when the payload size of the DCI format 1 differentiated from the payload size of the DCI format 1A/0 is an ambiguous size, the payload size of the DCI format 1 by appending padding bits to the DCI format 1 until the payload size of the DCI format 1 is not an ambiguous size; a payload generator that generates the payload of a downlink control channel based on the calculated payload size of the DCI format 1; and a channel coder/modulator that encodes and modulates the payload of the downlink control channel and transmits the payload on the downlink control channel.

In accordance with another embodiment of the present invention, a control channel data reception device for a wireless communication system in which downlink control information is encoded/decoded based on a payload size of DCI format is provided. The device includes a payload size calculator that configures a payload size of a DCI format 1 depending on a downlink bandwidth and a duplex mode, differentiates, when the payload size of the DCI format 1 is equal to a payload size of a DCI format 1A/0, the payload size of the DCI format 1 from the payload size of the DCI format 1A/0 by appending a padding bit to the DCI format 1, determines, when the payload size of the DCI format 1 differentiated from the payload size of the DCI format 1A/0 is an ambiguous size, the payload size of the DCI format 1 by appending padding bits to the DCI format 1 until the payload size of the DCI format 1 is not an ambiguous size; a demapper/demodulator that demaps and demodulates data of the downlink control channel; and a decoder that blind-decodes the demodulated data of the downlink control channel in units of the calculated payload size of the DCI format.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Several embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

As described above, in an LTE system, several Downlink Control Information (DCI) formats are defined to support different communication modes. A UE receives the DCI and performs blind decoding thereon without an explicit format identifier, and subsequently identifies the DCI format as a result of the blind decoding. The blind decoding is performed under an assumption that the different DCI formats have different payload sizes.

In accordance with an embodiment of the present invention, an improved algorithm for determining a number of padding bits to be appended to the DCI format to differentiate payload sizes of the distinctive DCI formats is described below.

Using Adaptive Modulation and Coding (AMC) and channel adaptive scheduling, a base station can allocate the resources including the frequency, time, and power based on the channel conditions of multiple users. The adaptive resource allocation information is transmitted from a base station to the UE through a Physical Downlink Control Channel (PDCCH) such that the UE can recognize the radio resources allocated thereto.

The PDCCH is used to carry the Downlink Control Information (DCI).

First, the DCI for Downlink resource allocation (hereinafter called "DL-DCI") will be described.

The downlink resource allocation is adaptively performed based on the changing channel conditions fed back by a corresponding UE and an amount of information to be transmitted to the UE. The PDCCH carries the information on the resource allocated to the corresponding UE for transmitting the data and modulation and coding schemes. The UE recognizes the resource allocated to itself and how to decode the data delivered within the resource based on the information carried by the PDCCH. A Cell Radio Network Temporary Identifier (C-RNTI) is a UE identifier used to uniquely identify a UE such that the UE can identify the signal destined to itself by checking the C-RNTI of the signal. The C-RNTI is implicitly encoded in the Cyclic Redundancy Check (CRC) attached to the downlink control information. Accordingly, if the DL control information is successfully decoded, the DL control information is destined to the UE.

Second, the DCI for Uplink resource allocation (hereinafter called "UL-DCI") will be described.

The base station makes scheduling decisions based on the uplink channel quality acquired from a sounding reference signal transmitted by the UE and determines an amount of data to be transmitted based on a UE buffer status report. The uplink resource allocation is performed based on the UL channel quality and the amount of data to be transmitted to the UE. The PDCCH carries the information on the uplink resource allocated to the UE and modulation and coding scheme to be used for the uplink transmission. The UE recognizes the uplink resource allocated to itself and how to encode the data to be transmitted within the uplink resource, based on the information carried by the PDCCH. Additionally, the dedicated uplink control information is identified using the C-RNTI as the dedicated downlink control information.

The PDCCH for DL-DCI includes the C-RNTI of the UE, Downlink Resource Block (DL RB) allocation information, Modulation and Coding Scheme (MCS) information, and Hybrid Automatic Repeat Request (HARQ) information. Regarding the DL RB information, if the DL control information is decoded successfully, the UE can identify the RBs on which the downlink transmission has been scheduled.

Regarding the MCS information, when the AMC algorithm is used in the system, the UE must know the MCS to perform demodulation and decoding on the received signal.

Regarding the HARQ information, the HARQ information indicates whether the packet transmitted by the base station is successfully received by the UE such that the base station transmits a next packet in response to a positive HARQ feedback and retransmits the previous packet in response to a negative HARQ feedback. The HARQ information includes a New Data Indicator (NDI) for indicating a new data transmission and a Redundancy Version (RV) when using the Incremental Redundancy (IR). The UE determines whether to combine the previously received packet before decoding or initialize a new decoding session.

The PDCCH for DL-DCI can further include the additional information related to the multiple antenna transmission, power control, and distributed RB assignment.

The PDCCH for UL-DCI includes C-RNTI, uplink RB assignment information, Modulation and Coding Scheme (MCS) information, and HARQ information.

For UL RB assignment, if the control information is decoded successfully, the UE can identify the RBs on which the uplink data has been scheduled.

Regarding the MCS information, when the AMC algorithm is used in the system, the UE must know the MCS to generate the uplink signal based on the MCS informed by the base station. The PDCCH for UL-DCI can further include additional information related to an uplink Reference Signal (RS) for supporting Space Domain Multiple Access (SDMA), distributed RB assignment, and channel quality information request.

The number of information bits included in a PDCCH is determined according to the control information carried by the PDCCH. For example, because the PDCCH for the DL-DCI and the PDCCH for the UL-DCI carry different information, their sizes differ from each other.

As another example, the PDCCH for the DL-DCI carrying Spatial Multiplexing (SM) information also contains multiple MCS indicators and HARQ indicators for multiple packet transmissions on a same frequency-time resource. Accordingly, the PDCCH for DL-DCI carrying the SM information is larger than the PDCCH for normal DL-DCI.

In order to differentiate the PDCCHs carrying different control information, several DCI formats are defined. Further, because the PDCCHs carrying different information have different sizes, the UE can decode the potentially transmitted DCI and, if the DCI has been successfully decoded, recognize which DCI format is transmitted, without using a format identifier.

Table 1 below shows DCI format types specified in 3GPP LTE standards.

TABLE 1

| DCI format | Usage | Size (number of bits) |
|---|---|---|
| 0 | UL-DCI | Equal to format 1A, 3, and 3A |
| 1 | DL-DCI | No format equal in size |
| 1A | DL-DCI for compressed RB assignment information | Equal to format 0, 3, and 3A |
| 1B | DL-DCI for precoding information and compressed RB assignment information | No format equal in size |
| 1C | DL-DCI for shared control information | No format equal in size |
| 1D | DL-DCI for SM and compressed RB assignment information | No format equal in size |
| 2 | DL-DCI for closed-loop SM information | No format equal in size |
| 2A | DL-DCI for open-loop SM information | No format equal in size |
| 3 | 2-bit TPC command | Equal to format 0, 1A, and 3A |
| 3A | 1-bit TPC command | Equal to format 0, 1A, and 3 |

As shown in Table 1, some DCI formats are the same size and others are not. For example, the formats 0, 1A, 3, and 3A are the same size. Accordingly, these formats cannot be differentiated based on format size.

However, the formats 0 and 1A can be differentiated with a differentiation flag. Because the format 0 carries UL-DCI and the format 1A carries DL-DCI, the UE identity information is contained therein. Meanwhile, the formats 3 and 3A are used to transmit transmission power control information multiplexed for multiple UEs so as to contain the TPC-RNTI rather than C-RNTI. Accordingly, the formats 0, 1A, 3, and 3A can be differentiated using the RNTI information. The formats 3 and 3A are selectively used for a given UE according to the determination by higher layers. Basically, there is no need to differentiate the formats 3 and 3A because these formats are not received simultaneously.

Although no format identifier is needed when the DCI formats are different in size, the UE still attempts decoding under an assumption of potential DCI formats, thereby increasing reception complexity. When all the DCI formats are the same size, the reception complexity decreases but the additional format identifiers increase the amount of transmitted information.

Table 2 below shows information fields of the DCI format 0 specified in 3GPP LTE standards.

TABLE 2

| Field | Number of bits |
|---|---|
| C-RNTI | 16 |
| Format 0/format 1A differentiation flag | 1 |
| Frequency hopping flag | 1 |
| Resource allocation | $\left\lceil \log_2\left(\frac{N_{RB}^{UL}(N_{RB}^{UL}+1)}{2}\right)\right\rceil$ |
| MCS and RV | 5 |
| NDI | 1 |
| TPC | 2 |
| Cyclic shit for DM RS | 3 |
| UL subframe index | 0 in FDD mode, 2 in TDD mode |
| CQI request | 1 |
| Padding bits appended to format 1A | $Z_0$ |

In Table 2, the format 0/format 1A differentiation flag is 1 bit, which is set to 0 to indicate format 0 and set to 1 to indicate format 1A. The frequency hopping flag is 1 bit that is set to 1 to instruct the UE to perform Physical Uplink Shared Channel (PUSCH) frequency hopping and set to 0 when there is no PUCH frequency hopping. It is preferable to enable frequency hopping to achieve diversity gain and disable frequency hopping to achieve AMC gain. Because the uplink data transmission is performed with a synchronous HARQ, the integrated 5-bit MCS and RV field is defined to inform the UE of the modulation and coding scheme and redundancy version for uplink transmission.

The cyclic shift for DM RS is 3 bits for uplink Space Division Multiple Access (SDMA) and indicates the orthogonal RS patterns for the UEs assigned the same RBs.

The UL subframe index is 2 bits, which are presented only for TDD operation, and not for FDD operation. Unlike the FDD operation mode in which constant uplink and downlink resources are allocated, the uplink and downlink is switched in the TDD mode. Because the uplink and downlink resources can be allocated asynchronously in the TDD mode, the resource allocation for multiple uplink subframes should be allowed with a single downlink subframe. Further, because the resources should be identified in both the frequency and time directions, the UL subframe index is used to indicate subframe in time direction.

In LTE, the Channel Quality Indicator (CQI) report is transmitted non-periodically and multiplexed with the uplink data to be transmitted. The CQI request flag is 1 bit and is used to indicate whether or not the UE periodically transmits the CQI.

In Table 2, the number of bits in the resource allocation field of the DCI format 0 is based on the uplink bandwidth. The bandwidth is expressed by a number of RBs in LTE. When the number of uplink RBs is $N_{RB}^{UL}$, the resource allocation field is set to $\lceil \log_2(N_{RB}^{UL}(N_{RB}^{UL}+1)/2)\rceil$ In LTE, an Orthogonal Frequency Division Multiple Access (OFDMA) scheme is used for downlink transmission, and Single Carrier Frequency Division Multiple Access (SC-FDMA), which is a low Peak to Average Power Ration (PAPR) scheme compared to OFDMA, is used for uplink transmission. In order to maintain the low PAPR, the transmission should be performed on consecutive RBs. That is, the signal transmitted on non-consecutive RBs using the SC-FDMA scheme increases PAPR. The resource allocation reflecting such resource allocation constraint can be expressed as illustrated in FIG. 1.

Figure 1:
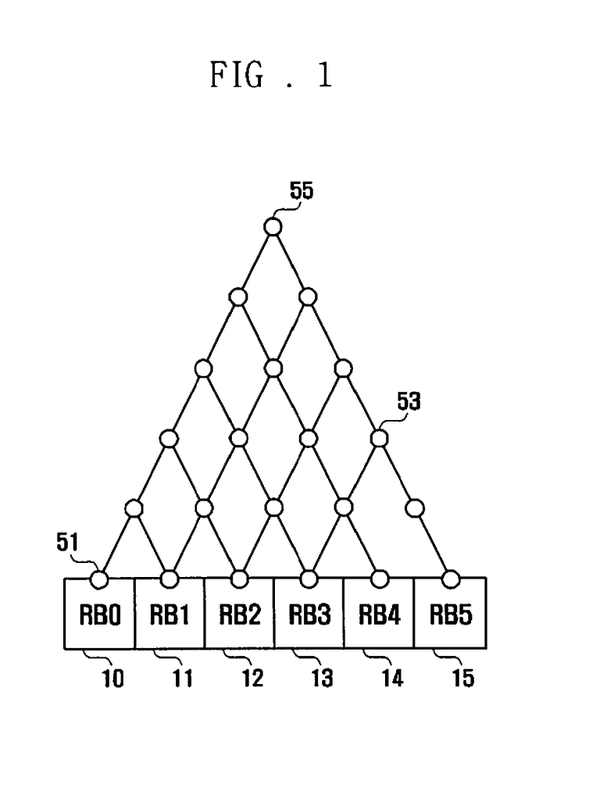
FIG. 1 is a diagram illustrating a compressed resource allocation expression method for 6 RBs according to an embodiment of the present invention.

More specifically, FIG. 1 is a diagram illustrating a compressed resource allocation expression method under an assumption of 6 RBs.

Referring to FIG. 1, the number of cases with 6 RBs (RB0 10, RB1 11, RB2 12, RB3 13, RB4 14, and RB5 15) is 5 for one RB, 4 for two RBs, 3 for three RBs, 3 for four RBs, 2 for 5 RBs, and 1 for 6 RBs. The number of cases can be explained with reference to the graph of FIG. 1. Node 51 denotes the case where only the RB0 10 is selected. Node 53 denotes the case where the RB3 13, RB4 14, and RB5 15, indicated by its sub-nodes, are selected. Node 55, as the highest node, denotes the case where all 6 RBs, i.e., RB0 10 to RB5 15, are selected.

According to the compressed resource allocation expression method, when the number of RBs is $N_{RB}^{UL}$, the number of cases for selecting $N_{RB}^{UL}-k$ RBs is $(k+1)$, where $k=0, 1, \ldots, N_{RB}^{UL}$. Accordingly, the number of cases for resource allocation can be expressed as shown in Equation (1).

$$\sum_{k=0}^{N_{RB}^{UL}}(1+k) = \frac{N_{RB}^{UL}(N_{RB}^{UL}+1)}{2} \tag{1}$$

In Equation (1), the number of bits required for an uplink resource allocation field is $\lceil \log_2(N_{RB}^{UL}(N_{RB}^{UL}+1)/2)\rceil$.

Because the information carried by the DCI format 0 and 1A differ from each other, the numbers of bits of the formats 0 and 1A are likely to be different from each other. Further, because the sizes of the formats 0 and 1A should be equal to each other, $Z_0$ padding bits are appended to format 0. The padding bits are zero bits. How to determine $Z_0$ will be described later in more detail.

The DCI format 1A is a DL-DCI using the same compressed resource allocation expression as DCI format 0 and includes the information fields as shown in Table 3 below.

TABLE 3

| Field | Number of bits |
|---|---|
| C-RNTI | 16 |
| Format 0/format 1A differentiation flag | 1 |
| Distributed resource allocation flag | 1 |
| Resource allocation | $\left\lceil \log_2\left(\frac{N_{RB}^{DL}(N_{RB}^{DL}+1)}{2}\right)\right\rceil$ |
| MCS | 5 |
| HARQ process number | 3 for FDD, 4 for TDD |
| NDI | 1 |
| RV | 2 |
| TPC command | 2 |
| DL subframe index | 0 in FDD mode, 2 in TDD mode |
| Padding bits appended to format 0 | $Z_{1A}$ |
| Padding bits appended to avoid the size from belonging to one of ambiguous sizes | 1 when the size belongs to one of ambiguous sizes, otherwise 0. |

In Table 3, the format 0/format 1A differentiation flag is 1 bit, which is set to 0 to indicate format 0 and set to 1 to indicate format 1A. The distributed resource allocation flag is 1 bit, which is used in similar manner to the frequency hopping flag, to indicate whether the downlink resource is allocated in distributed manner.

In order to achieve diversity gain, it is preferable to use the distributed resource allocation. Because the downlink data transmission is performed in asynchronous HARQ, the individual 5-bit MCS and 2-bit RV fields are defined, and an HARQ process number field is added to identify the HARQ process. The HARQ process number field is 3 bits in FDD mode and 4 bits in TDD mode.

Because the DCI format 0 and DCI format 1A carry different information, the number of information bits in each of the DCI formats 0 and 1A is likely to be different from each other. However, because DCI formats 0 and 1A should in the same size, $Z_{1A}$ padding bits are appended to the DCI format 1A until the payload size is the same as format 0. If the number of information bits in format 1A is greater than that of format 0 before appending the padding bits, $Z_0=0$.

The padding bits appended to format 1A are zero bits. Additionally, how to determine $Z_{1A}$ will be described later in more detail.

Because the DCI format 0 is formed in similar manner, it is required that a DCI format's payload size be determined first. For DCI format 1A, there is an additional step of appending one padding bit when the payload size in format 1A, except for the 16-bit UE identifier, is an ambiguous size. Accordingly, it is preferable to determine the payload size of format 1A first and then that of format 0. A method of determining the payload sizes of DCI formats 0 and 1A will be described in more detail below with reference to FIG. 3.

The payload size of format 1A should not be an ambiguous size because a channel coding rate of the PDCCH can be adjusted according to the channel condition of the UE. That is, because the PDCCH is coded with a fixed QPSK modulation scheme, adjusting the channel coding rate means adjusting the frequency-time resource amount for transmitting the PDCCH. When a channel condition of the corresponding UE is good, it is possible for the UE to receive the PDCCH transmitted with small amount of frequency-time resource. However, when a channel condition of the UE is bad (e.g., when the UE is positioned at a cell boundary), the PDCCH should be transmitted with a relatively large amount of frequency-time resources. Because the amount of resources for the PDCCH is variable, the UE should estimate the resource amount allocated for the PDCCH transmitted to itself. Accordingly, the UE performs blind decoding on the PDCCH with potential resource amounts. If the payload size of DCI format has a specific value, the PDCCH can be successfully decoded with multiple potential resource amounts.

In order to avoid this problem, a padding bit is appended to forcibly increase payload size, such that the payload size is not an ambiguous size. The ambiguous payload sizes are a set $S_{AS}=\{12, 14, 16, 20, 24, 26, 32, 44\ 56\}$. That is, the number of information bits (payload size) of the DCI, except for the UE identifier, is ambiguous when it belongs to one of the set $S_{AS}=\{12, 14, 16, 20, 24, 26, 32, 44, \text{ and } 56\}$. When the number of information bit is one of 12, 14, 16, 20, 24, 26, 32, 44, and 56, a padding bit is appended to the format.

For example, if a payload size of a DCI format is 24 bits, which is an ambiguous size, a padding bit is appended to the DCI format, resulting in a 25 bit payload size. Because this problem occurs only in the DL-DCI, there is no need to consider this problem in the DCI format 0 for the UL-DCI.

In DCI format 1A, the value of the resource allocation field is determined depending on the downlink bandwidth. When the number of downlink RBs is $N_{RB}^{DL}$, the resource allocation field is set to $\lfloor \log_2(N_{RB}^{DL}(N_{RB}^{DL}+1)/2) \rfloor$.

As described above, in LTE, an OFDMA scheme is used for downlink transmission. Therefore, there is no need to consider the constraint of consecutive RBs allocation for reducing PAPR. However, because adopting the constraint reduces the number of bits for indicating resource allocation, it is preferred to use the same method used in the DCI format 0 when the compressed resource allocation expression is used as the DCI format 1A. It is noted that the number of bits required for resource allocation is determined by $N_{RB}^{DL}$ because the uplink and downlink bandwidth may differ from each other in the LTE system.

Unlike the DCI format 1A, the DCI format 1 is a DL-DCI that does not use the compressed allocation expression method and includes the information fields as shown in Table 4 below.

TABLE 4

| Field | Number of bits |
|---|---|
| C-RNTI | 16 |
| Resource allocation header | 0 if DL bandwidth ≤ 10 RBs, otherwise 1 |
| Resource allocation | $\left\lceil \dfrac{N_{RB}^{DL}}{P} \right\rceil$ |
| MCS | 5 |
| HARQ process number | 3 for FDD, 4 for TDD |
| NDI | 1 |
| RV | 2 |
| TPC command | 2 |
| DL subframe index | 0 in FDD mode, 2 in TDD mode |
| Padding bits appended to format 0/1A | 1 when equal to format 0/1A, otherwise 0 |
| Padding bits appended to avoid the size from belonging to one of ambiguous sizes | 1 when the size belongs to one of ambiguous sizes, otherwise 0 |

In Table 4, the DCI format 1 differs from the DCI format 1A in three aspects. First, the format 1 does use a bit for a format 0/1A differentiating flag because the format 1 is different from the format 0/1A in payload size. In order to avoid the format 1 having the same payload size as the format 0/1A, a number of padding bits $Z_1$ is defined. If the payload size of format 1 differs from that of format 0/1A, $Z_1=0$.

Instead of a 1-bit distributed resource allocation flag, the format 1 includes a 1-bit resource allocation header. Because the DCI format 1 has no constraint on consecutive RB allocation, there is no need to define the distributed resource allocation. The 1-bit resource allocation header is used to indicate a group resource allocation type or a subset resource allocation type. If the downlink bandwidth is less than or equal to 10 RBs, there is no difference between the two resource allocation type, thereby no resource allocation is required.

Hereinbelow, the group resource allocation method is described with reference to FIG. 2, but the detailed description about the subset resource allocation method is omitted since the two types of resource allocation methods use the same number of bits to indicate the allocated resource and the resource allocation is outside of the scope of the present invention.

Finally, format 1 differs from format 1A in resource allocation method. As described above, format 1A has a constraint of consecutive RBs assignment, but format 1 can express the resource allocation in more diverse ways by introducing other constraints.

Figure 2:
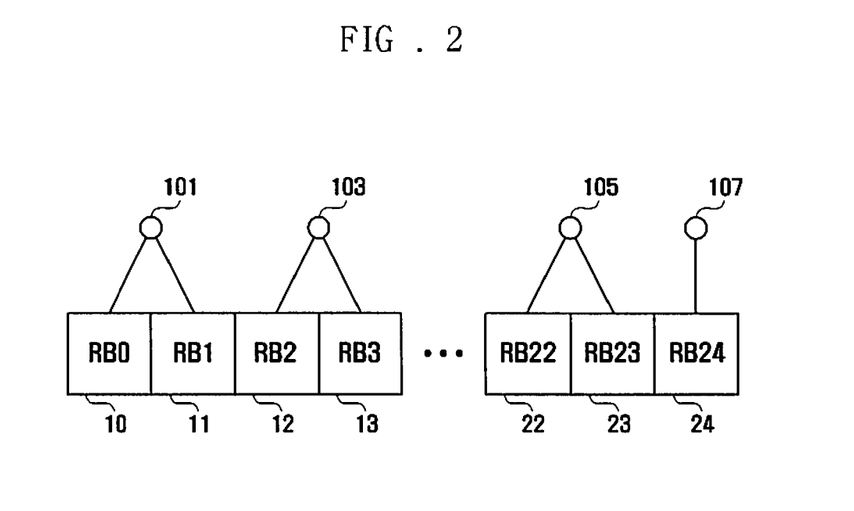
FIG. 2 is a diagram illustrating a principle of a group resource allocation method supported in DCI format 1 according to an embodiment of the present invention.

FIG. 2 is a diagram illustrating a principle of a group resource allocation method supported in DCI format 1.

Referring to FIG. 2, the downlink bandwidth includes 25 RBs (RB0 10 to RB24 24). In order to assign resources in a unit of an RB, a 25-bit bitmap is defined. Similarly, when 100 RBs are defined, 100-bit bitmap is required. Accordingly, the bitmap method is inefficient as the bandwidth increases. In order to solve this problem, a group resource allocation method is introduced.

Referring to FIG. 2, node 101 denotes a resource block group including RB0 10 and RB1 11. Nodes 101, 103, 105, and 107 are bitmaps indicating corresponding resource block groups. For example, if the first and second bits are set to 1, nodes 101 and 103 are selected to assign the RB0 10, RB1 11, RB12 12, and RB13 13. Using the bitmap indication, non-consecutive resource allocation is possible. For example, by selecting node 101 and node 105, four non-consecutive resource blocks (RB0 10, RB1 11, RB22 22, and RB23 23) can be assigned.

In the example illustrated in FIG. 2, a group size P is 2. In order to prevent a size of a bitmap from increasing in proportion to the number of RBs, the group size can be increased at increasing intervals, as the number of RBs increases. An example of the group size P being determined depending on the number of RBs is shown below in Table 5.

TABLE 5

| $N_{RB}^{DL}$ | Group size, P |
|---|---|
| ≤10 | 1 |
| 11~26 | 2 |
| 27~63 | 3 |
| 64~110 | 4 |

In Table 5, the size of resource allocation bitmap is determined depending on the number of groups. If the number of downlink RBs is $N_{RB}^{DL}$ and the group size is P, the size of bitmap is $\lceil N_{RB}^{DL}/P \rceil$.

DCI format 1 supports a subset resource allocation method as well as the group resource allocation method. The number of bits of the resource allocation field is $\lceil N_{RB}^{DL}/P \rceil$ in both the resource allocation methods. A detailed description of the subset resource allocation method is omitted in the present application.

The present invention is directed to a method for solving the problem related to differentiation between the DCI formats 0, 1, and 1A. Therefore, descriptions of the other DCI formats listed in Table 1 are not presented herein.

Figure 3:
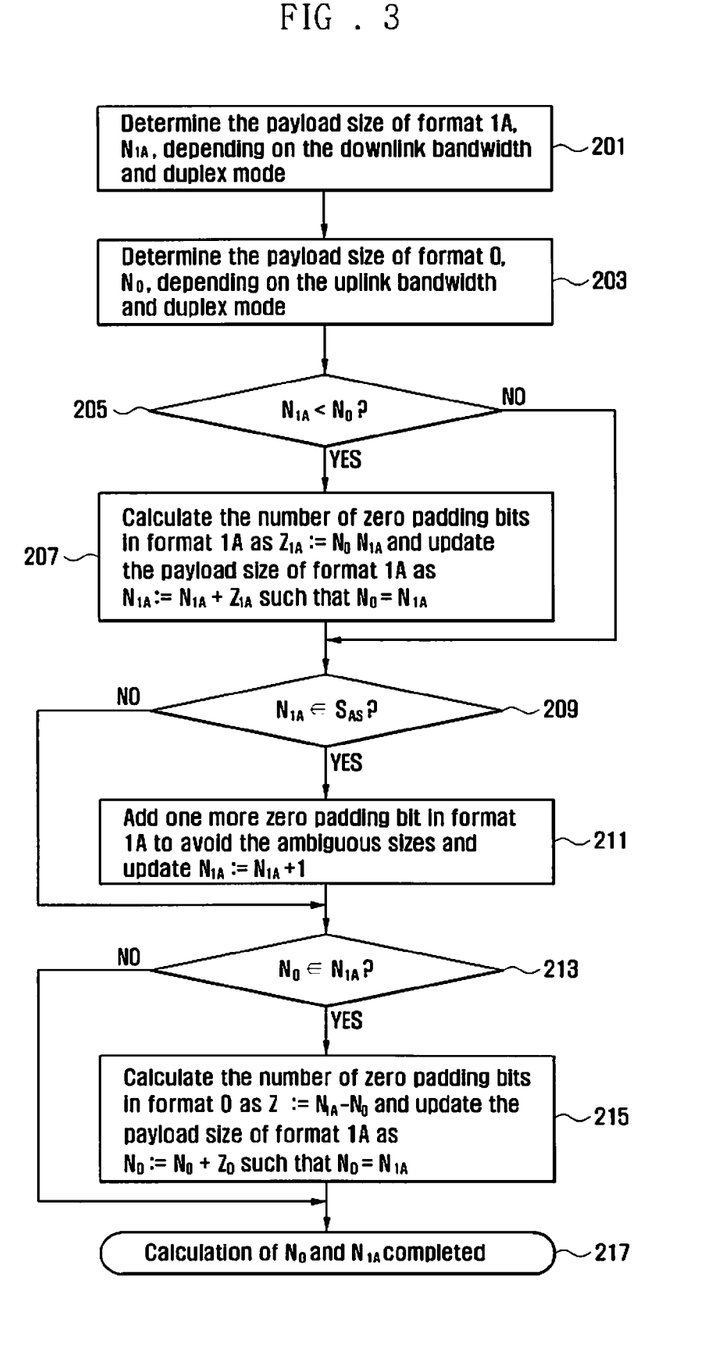
FIG. 3 is a flowchart illustrating a procedure of determining payload sizes of DCI formats 0, 1, and 1A in a downlink control information transmission method according to an embodiment of the present invention.

FIG. 3 is a flowchart illustrating a procedure of determining payload sizes of DCI formats 0, 1, and 1A in a downlink control information transmission method according to an embodiment of the present invention. The payload size determination procedure of FIG. 3 can be performed in a payload controller of a downlink control channel transmitter.

Because the DCI formats 0 and 1A have the same payload size and the payload size of the DCI format 1A is not an ambiguous size, the payload sizes of the DCI formats 0 and 1A are determined through the payload size determination procedure illustrated in FIG. 3.

In FIG. 3, the payload size of the DCI format 0 is $N_0$, and the payload size of the DCI format 1A is $N_{1A}$.

A payload controller determines the payload size $N_{1A}$ of the DCI format 1A in step 201. The payload size $N_{1A}$ of the DCI format 1A is determined depending on the downlink bandwidth (i.e., the number of RBs) and the duplex mode as described in Table 3. The padding bits and 16-bit UE identifier are excluded from determining the payload size $N_{1A}$.

In step 203, the payload controller determines the payload size $N_0$ of the DCI format 0. The payload size $N_0$ of the DCI format 0 is determined depending on the uplink bandwidth (i.e., the number of uplink RBs) and the duplex mode as described in Table 2. Here, the padding bits and 16-bit UE identifier are also excluded from determining the payload size $N_0$.

Once the payload sizes $N_{1A}$ and $N_0$ are determined, the payload controller compares the payload size $N_{1A}$ of DCI format 1A and the payload size $N_0$ of DCI format 0 to determine whether the payload size $N_{1A}$ of the DCI format 1A is less than the payload size $N_0$ of the DCI format 0 in step 205. Because a padding bit can be appended to the DCI format 1A to avoid the payload size of the DCI format 1A being an ambiguous size, the payload controller determines the payload size $N_0$ of the DCI format 1A first and then the DCI format 0 in consideration of the payload size $N_{1A}$ of the DCI format 1A. The payload size comparison at step 205 is performed to determine the number of padding bits to be appended when the payload size $N_{1A}$ calculated at step 201 is less than the payload size $N_0$ calculated at 203.

More specifically, if $N_{1A}<N_0$, in step 207, the payload controller calculates the number of padding bits ($Z_{1A}=N_0-N_{1A}$) to append to the DCI format 1A and updates the payload size of the DCI format 1A as $N_{1A}=N_{1A}+Z_{1A}$, such that $N_0=N_{1A}$. However, if $N_{1A}\geq N_0$, step 207 is skipped.

In step 209, the payload controller determines whether the updated payload size $N_{1A}$ of the DCI format 1A is an ambiguous size ($S_{AS}$). As described above, the $S_{AS}$ is a set of ambiguous payload sizes. If the payload size $N_{1A}$ of the DCI format 1A is an ambiguous size, in step 211, the payload controller appends a padding bit to the DCI format 1A and, subsequently, updates the $N_{1A}$ as $N_{1A}=N_{1A}+1$. However, if the payload size $N_{1A}$ is not an ambiguous size, step 211 is skipped.

The payload size $N_{1A}$ of the DCI format 1A is finally determined as a result of steps 209 and 211.

When the payload size $N_0$ of DCI format 0 calculated is less than the payload size $N_{1A}$ of the DCI format 1A at step 205, and step 207 is skipped, this state is maintained.

When the payload size $N_{1A}$ of the DCI format 1A is less than the payload size $N_a$ of the DCI format 10 in steps 205 and 207, the payload size $N_{1A}$ of the DCI format 1A is forcibly equaled to the payload size $N_0$ of DCI format 0. However, the payload size $N_{1A}$ of the DCI format 1A is likely to be greater than the payload size $N_0$ of the DCI format 0 through steps 209 and 211. Because the payload sizes of the DCI formats 0 and 1A should be the same, the payload size $N_0$ of the DCI format 0 must be equal to the payload size $N_{1A}$ of the DCI format 1A.

Accordingly, the payload controller compares the finally acquired $N_{1A}$ with $N_0$ to determine whether the $N_0$ is less than $N_{1A}$ in step 213. If $N_0$ is less than $N_{1A}$, in step 215, the payload controller appends a number of padding bits ($Z_0:=N_{1A}-N_0$) to the DCI format 0 and updates the payload size $N_0$ of format 0 as $N_0:=N_0+Z_0$, such that $N_0=N_{1A}$.

In step 217, the payload controller completes the determination of the payload sizes $N_0$ and $N_{1A}$ of the DCI formats 0 and 1A satisfying the condition $N_0=N_{1A}$, while $N_{1A}$ is not an ambiguous size.

Figure 4:
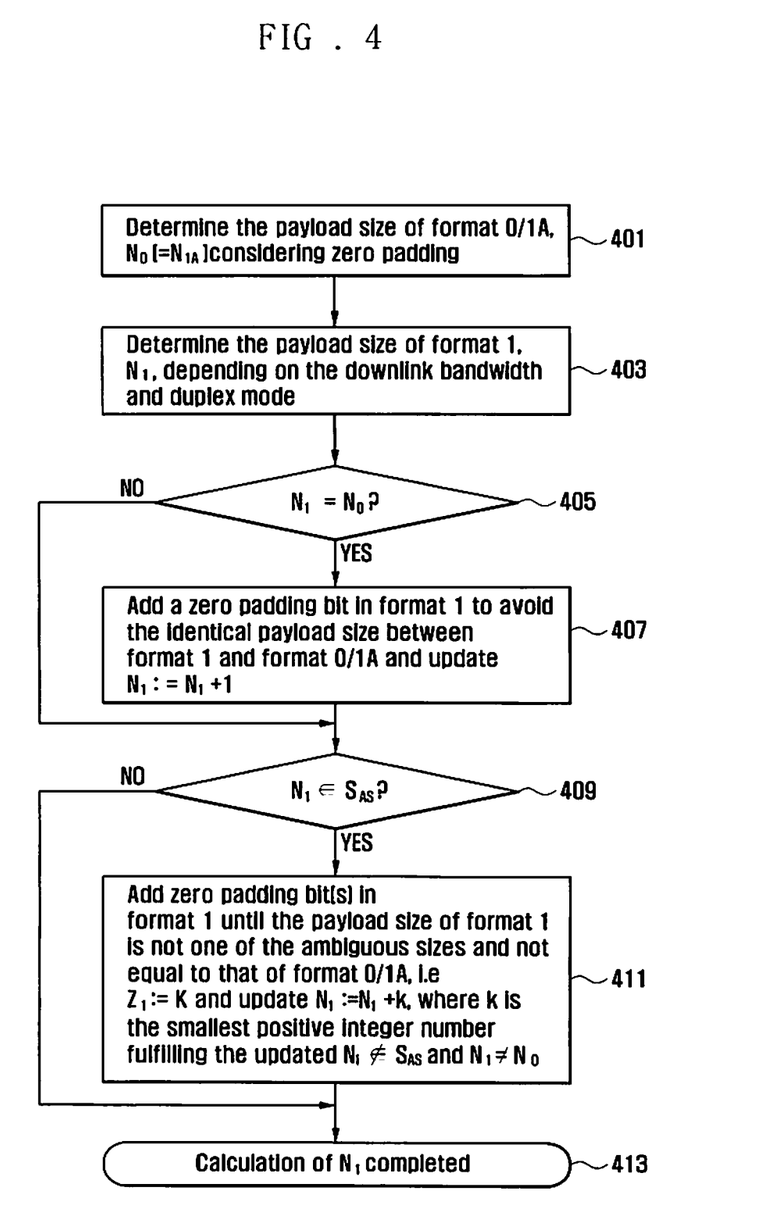
FIG. 4 is a flowchart illustrating a procedure of determining a payload size of DCI format 1 in a downlink control information transmission method according to an embodiment of the present invention.

FIG. 4 is a flowchart illustrating a procedure of determining payload size of DCI format 1 in a downlink control information transmission method according to an embodiment of the present invention.

Referring to FIG. 4, in step 401, the payload controller determines the payload size $N_0$ of the DCI format 0 and the payload size $N_{1A}$ of the DCI format 1A in consideration of padding bits. The payload sizes $N_0$ and $N_{1A}$ are determined to be equal to each other according to the procedure of FIG. 3.

In step 403, the payload controller determines the payload size $N_1$ of the DCI format 1. The payload size $N_1$ of the DCI format 1 is determined depending on the downlink bandwidth (i.e., the number of RBs) and duplex mode as described in Table 4. The padding bits and 16-bit UE identifier are excluded from determining the payload size $N_1$.

As described above, the payload size of the DCI format 1 must differ from the payload size of the DCI format 0/1A. Accordingly, in step 405, the payload controller compares the payload size $N_1$ with the payload size $N_0$ to determine whether the $N_1$ is equal to $N_0$. If the $N_1$ is equal to $N_0$, in step 407, the payload controller appends one padding bit to the DCI format 1 to differentiate the payload sizes and updates the payload size N1 (N1:=N1+1). Otherwise, if $N_1$ is not equal to $N_0$, step 407 is skipped.

In step 409, the payload controller determines whether the updated payload size $N_1$ of the DCI format 1 is an ambiguous size $S_{AS}$. As described above, the $S_{AS}$ is a set of ambiguous payload sizes.

If the payload size $N_1$ of the DCI format 1 is not an ambiguous size, in step 411, the payload controller appends padding bits to the DCI format 1 until the payload size of the DCI format 1 is not an ambiguous size and is not equal to the payload size of the DCI format 0/1A. That is, the payload controller appends k padding bit(s) to the DCI format 1 and updates $N_1:=N_1+k$, where k is the smallest positive integer that satisfies the conditions that the payload size of the DCI format 1 is not an ambiguous size and is not equal to the payload size of the DCI format 0/1A. Otherwise, if the payload size $N_1$ of the DCI format 1 does not belong to one of the ambiguous sizes, step 411 is skipped.

In step 413, the payload controller completes the determination of the payload size N1 of DCI format 1.

Appending a padding bit to the DCI format 1 to avoid the payload size of the DCI format 1 from belonging to one of the ambiguous bits may cause a problem in which the payload size of the DCI format 1 equals to the payload size of the DCI format 0/1A. In order to prevent this problem from occurring, the format 1 payload size determination procedure in accordance with an embodiment of the present invention appends padding bits to the DCI format 1 until the payload size of the DCI format 1 is not an ambiguous size and is also not equal to the payload size of the DCI format 0/1A. At this time, k padding bit(s) is appended to the DCI format 1, and k is the smallest positive integer that satisfies the conditions that the payload size of the DCI format 1 is not an ambiguous size and is not equal to the payload size of the DCI format 0/1A.

The number of bits of the payload is adjusted because, where the $N_0$ and $N_1$ have a relationship of $N_1=N_0-1$, and $N_1$ is an ambiguous size, incrementing $N_1$ by 1 ($N_1=N_1+1$) by appending a padding bit results in $N_0=N_1$. In order to avoid this problematic situation, another padding bit can be appended, i.e., $N_1+2$. However, appending two padding bits may also can make the payload size an ambiguous size. Among the ambiguous sizes, i.e., $S_{AS}=\{12, 14, 16, 20, 24, 26, 32, 44, \text{and } 56\}$, there are the three subsets, (12, 14), (14, 16), and (24, 26), each having two elements of which a difference is 2. Therefore, two padding bits appended to the format 1 to avoid the problem caused by the one padding bit addition may cause an ambiguous size problem.

In this situation, three padding bits can solve the ambiguous size problem. That is, the number of padding bits to be appended to the format 1 to avoid the payload size of the format 1 being an ambiguous size can be 1, 2, or 3 depending on the situation. The payload size determining procedure for the DCI format 1 according to an embodiment of the present invention allows an optimal number of padding bits in consideration of various situations, thereby preventing a decoding error at UE.

Figure 5:
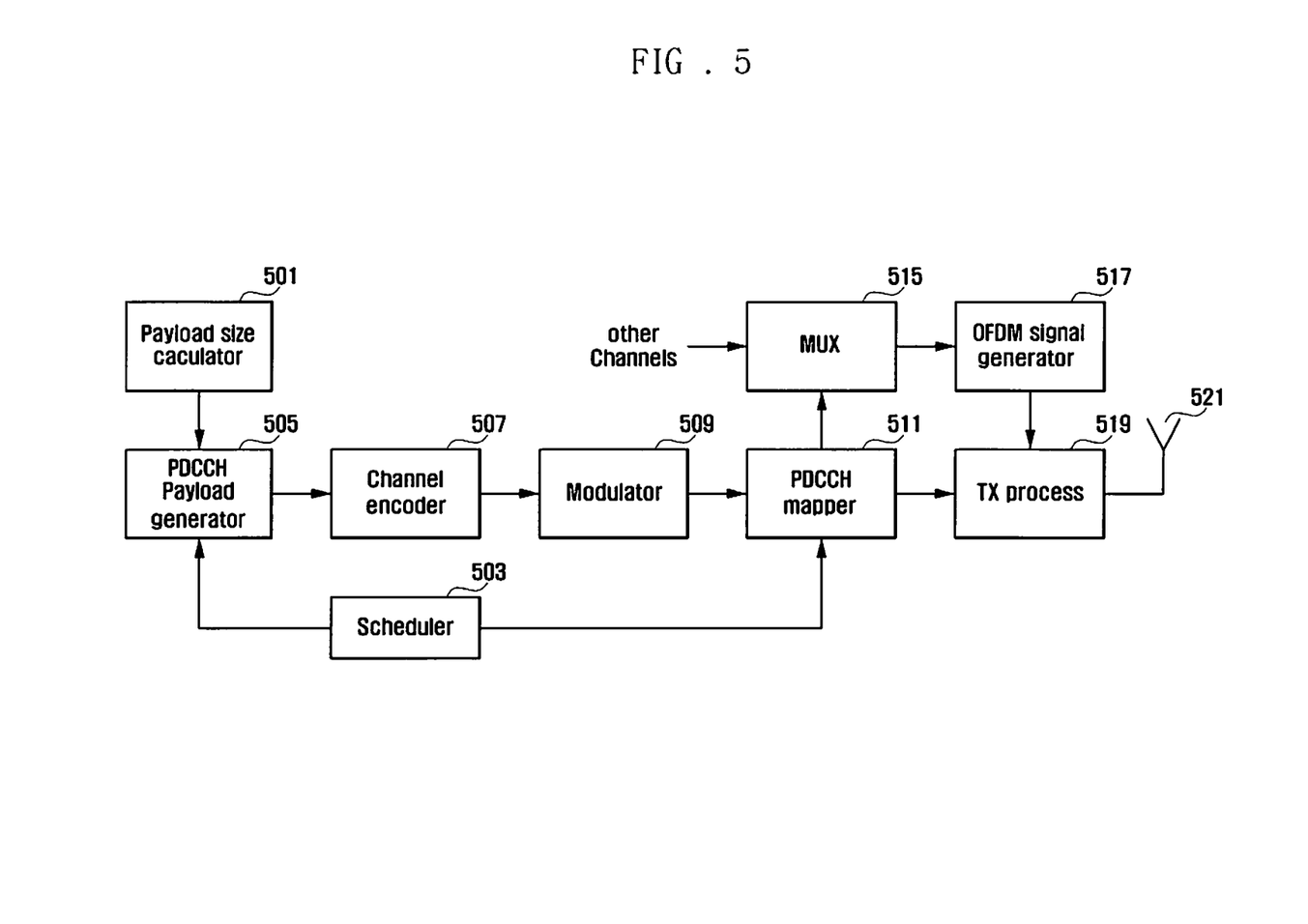
FIG. 5 is a block diagram illustrating a configuration of a downlink control channel transmitter of a base station in a wireless communication system according to an embodiment of the present invention.

FIG. 5 is a block diagram illustrating a configuration of a downlink control channel transmitter of a base station in a wireless communication system according to an embodiment of the present invention.

Referring to FIG. 5, the downlink control channel transmitter includes a payload size calculator 501, a scheduler 503, a PDCCH payload generator 505, a channel encoder 507, a modulator 509, a PDCCH mapper 511, a multiplexer (MUX) 515, an OFDM signal generator 517, and a Radio Frequency (RF) transmitter 519. The payload size calculator 501 calculates the payload size of DCI formats through the payload size determination algorithm according to an embodiment of the present invention. That is, the payload controller 510 performs the procedure illustrated in FIG. 4 to determine the number of bits of the payload of the PDCCH. The scheduler 503 controls generation of control information and mapping the control information to the PDCCH. The PDCCH payload generator 505 generates the control information to be transmitted on the PDCCH, based on the payload size output by the payload controller 501 under the control of the scheduler 503.

The channel encoder 507 performs channel coding on the PDCCH payload in a predetermined coding scheme. The modulator 509 performs modulation on the channel-coded signal in a predetermined modulation scheme.

The multiplexer 515 multiplexes the PDCCH containing control information and other channels (e.g., PDCCH). The OFDM signal generator 517 transforms the multiplexed signal output by the multiplexer 515 into OFDM signal, and the RF transmitter 519 converts the OFDM signal output by the OFDM signal generator 517 into a predetermined transmission band frequency and transmits the radio frequency signal over the air.

More specifically, the payload controller 501 determines payload sizes $N_0$ and $N_{1A}$ ($N_0=N_{1A}$) of the DCI formats 0 and 1A and then $N_1$ of the DCI format 1 in consideration of the $N_0$ (=$N_{1A}$) as described with reference to FIG. 3. The payload size of the DCI format 1 is determined depending on the downlink bandwidth (i.e., the number of RBs) and duplex mode as described in Table 4. As described above, the padding bits and 16-bit UE identifier are excluded from determining the payload size $N_1$. Because the payload size of the DCI format 1 must not be equal to that of the DCI format 0/1A, the payload controller 501 compares $N_1$ with $N_0$ and, if $N_1$ is equal to $N_0$, appends a padding bit to the DCI format 1 and updates $N_1$ ($N_1=N_1+1$). Otherwise, if $N_0$ is not equal to $N_1$, the payload controller 501 skips the padding bit appending process.

Next, the payload controller 501 determines whether the payload size $N_1$ of the DCI format 1 is an ambiguous size and, if the payload size $N_1$ is an ambiguous size, appends padding bits to the DCI format 1 until the payload size is not an ambiguous size. At this time, the payload controller appends k padding bit(s) to the DCI format 1, where k is the smallest positive integer that satisfies the conditions that the payload size of the DCI format 1 is not an ambiguous size and is not equal to the payload size of the DCI format 0/1A. However, if the payload size N, of the DCI format 1 is not an ambiguous size, the payload controller 501 skips the padding bit addition process.

Once the payload size calculation has completed, the payload controller 501 determines payload size N1 of the DCI format 1 and informs the payload generator 505 of the payload size N1 of the DCI format 1.

Once the payload size of the DCI format is determined by the payload controller 501, the payload generator 505 inserts the control information into the payload of the PDCCH.

In PDCCH, the number of zero padding bits is determined depending on the payload size, such that the payload generator 505 generates the payload using the payload size calculated by the payload controller 501. The control information to be carried by the PDCCH is determined by the scheduler 503.

That is, the scheduler 503 allocates resources to the UE and controls the payload generator 505 that is responsible for generating the payload and the PDCCH mapper 511 that is responsible for mapping the PDCCH to the frequency-time resources allocated per user.

Once all the information of the PDCCH is defined, the PDCCH information is encoded by the channel encoder 507 and then modulated by the modulator 509 into QPSK signal. The modulation signal is output to the PDCCH mapper 511 in order to be mapped to the frequency-time resources allocated per user. The PDCCH signal is multiplexed with other channels by the multiplexer 515 and then converted into the OFDM signal by the OFDM signal generator 517. Finally, the OFDM signal is converted into radio frequency signal and then transmitted through a transmission antenna 512.

Figure 6:
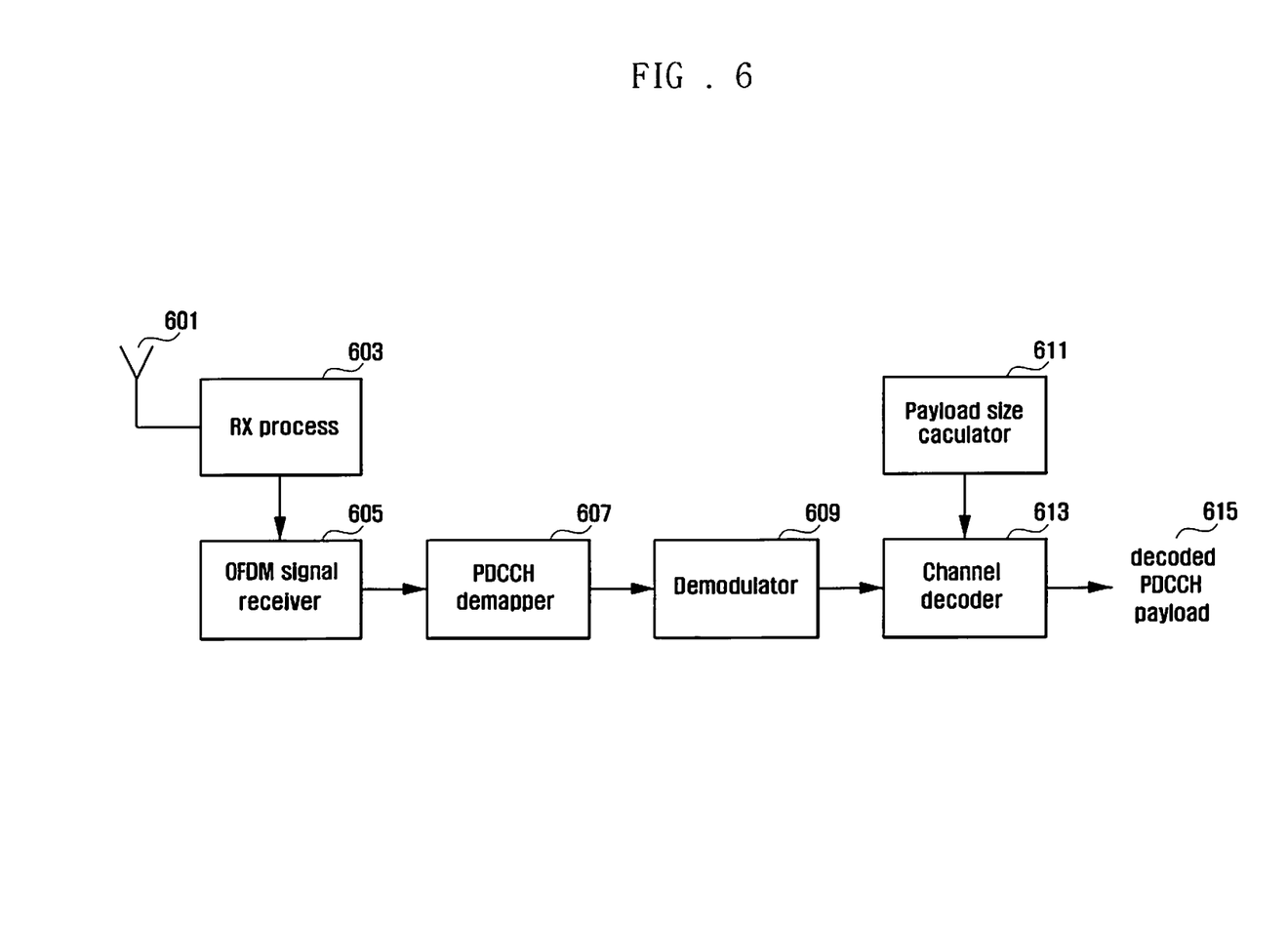
FIG. 6 is a block diagram illustrating a configuration of a downlink control channel receiver of a UE in a wireless communication system according to an embodiment of the present invention.

FIG. 6 is a block diagram illustrating a configuration of a downlink control channel receiver of a UE in a wireless communication system according to an embodiment of the present invention.

Referring to FIG. 6, the downlink control channel receiver includes an RF receiver 603, an OFDM signal receiver 605, a PDCCH demapper 607, a demodulator 609, a payload size calculator 611 and a channel decoder 613. The RF receiver 603 converts the RF signal received through antenna 601 into a baseband signal. The OFDM signal receiver 605 recovers the frequency-time signals from the baseband signal. The PDCCH demapper 607 performs demapping on the signal output by the OFDM signal receiver 605 to recover the signal mapped to the PDCCH. The demodulator 609 demodulates the signal demapped by the PDCCH demapper 607. The payload size calculator 611 calculates the payload size for DCI format of the received PDCCH according to an exemplary embodiment of the present invention. The channel decoder 613 performs decoding on the signal output by the demodulator 609 based on the payload size calculated by the payload size calculator 611.

More specifically, the RF signal received through the antenna 601 is converted into a base band signal by the RF receiver 603 and then recovered to a frequency-time signal by the OFDM signal receiver 605. The frequency-time signal is demapped by the PDCCH demapper 607 and demodulated by the demodulator 609 so as to be output in the form of a PDCCH. The channel decoder 613 must know the payload size of the DCI format for channel decoding. Accordingly, the payload controller 611 calculates the payload size of the DCI format and outputs the calculated payload size to the channel decoder 613. The channel decoder 613 then performs decoding on the PDCCH, based on the payload size calculated by the payload controller 611. Therefore, the downlink control channel receiver of the UE can acquire the control information carried by the PDCCH.

Because the payload size of the DCI format 1 is differentiated from that of the DCI format 0/1A, i.e., the different DCI formats have different payload sizes, the downlink control channel receiver can differentiate the DCI format 1 from the DCI format 0/1A. Accordingly, the UE can correctly process the PDCCH based on the DCI format of the PDCCH.

The payload controller 501 of the downlink control channel transmitter of base station and the payload controller 611 of the downlink control channel receiver of UE can each be implemented with a memory. In this case, the payload size of each DCI formation can be calculated with reference to the uplink and downlink bandwidths and duplex mode information, and then stored in the memory (base station downlink control information transmitter 501 and UE downlink control information receiver 611) and provided, if requested, to the payload generator 505 of the downlink control information transmitter 50 and the channel decoder 613 of the downlink control information receiver.

Although the payload controller 501 of the downlink control information transmitter 501 of the base station and the payload controller 611 of the downlink control information receiver of the UE can be replaced by memories, the payload size of DCI format 1 stored in the memory must be calculated through the payload size determination procedure according to an embodiment of the present invention.

As described above, the downlink control information transmission device and apparatus in accordance with the embodiments of the present invention enable efficient payload size differentiating of DCI format 1 from that of DCI format 0/1A, thereby improving PDCCH decoding performance at UE.

Also, the downlink control information transmission device and apparatus of the present invention first determine the payload size of the DCI format 0/1A and DCI format 1 and, if the payload size of the DCI format 1 is an ambiguous size, appends padding bits to the DCI format 1 until the payload size of the DCI format 1 is not an ambiguous size and is not equal to the payload size of the DCI format 0/1A, such that the UE can differentiate the DCI formats of the downlink control information based on the payload size, resulting in improvement of PDCCH processing stability.

Although various embodiments of the present invention have been described in detail hereinabove, it should be clearly understood that many variations and/or modifications of the basic inventive concepts taught herein will still fall within the spirit and scope of the present invention, as defined in the appended claims and their equivalents.

What is claimed is:

1. A method for generating downlink control information (DCI) by a transmitter, the method comprising:
   identifying, by a transmitter, information bits in a first DCI and information bits in a second DCI;
   appending, by the transmitter, if a number of the information bits in the second DCI is equal to a number of the information bits in the first DCI, one bit of value zero to the second DCI;
   appending, by the transmitter, if the number of the information bits in the second DCI belongs to one of ambiguous sizes, one or more zero bits to the second DCI and identifying a payload size including the one or more zero bits of the second DCI based on the ambiguous sizes and the payload size of the first DCI; and
   transmitting, by the transmitter, the second DCI to a receiver,
   wherein appending one or more zero bits to the second DCI and identifying the payload size comprises appending the one or more zero bits to the second DCI and identifying the payload size including the one or more zero bits until the payload size including the one or more zero bits of the second DCI does not belong to one of the ambiguous sizes and the payload size including the one or more zero bits of the second DCI is not equal to a payload size of the first DCI based on a result of the identification, and wherein the transmitted second DCI is received based on the payload size of the second DCI.

2. The method of claim 1, wherein the ambiguous sizes comprise one of 12, 14, 16, 20, 24, 26, 32, 44, and 56 information bits.

3. The method of claim 1, wherein the first DCI comprises a DCI format 0 and a DCI format 1A and the second DCI comprises a DCI format 1, and wherein identifying the information bits in the first DCI and the information bits in the second DCI comprises:

appending, if a number of information bits in the DCI format 1A is less than a number of information bits in the DCI format 0, at least one zero bit to the DCI format 1A until the payload size of the DCI format 1A is equals the payload size of the DCI format 0; and appending, if the number of the information bits in the DCI format 1A belongs to one of the ambiguous sizes, one zero bit to the DCI format 1A.

4. The method of claim 3, wherein identifying the information bits in the first DCI and the information bits in the second DCI further comprises:

appending, if the number of the information bits in the DCI format 0 is less than the payload size of the DCI format 1A, at least one zero bit to the DCI format 0 until the payload size of the DCI format 0 is equals the payload size of the DCI format 1A.

5. A method for receiving control information at a receiver, the method comprising:

receiving, by a receiver, the control information comprising at least one of a first downlink control information (DCI) and a second DCI from a transmitter; and decoding, by the receiver, the control information based on a payload size of the received first DCI and a payload size of the received second DCI, wherein one bit of value zero is appended to the second DCI by the transmitter if a number of information bits in the second DCI is equal to a number of information bits in the first DCI, and wherein one or more zero bits is appended to the second DCI by the transmitter, if the number of the information bits in the second DCI belongs to one of ambiguous sizes, and the payload size including the one or more zero bits of the second DCI is identified by the transmitter based on the ambiguous sizes and the payload size of the first DCL, and wherein the one or more zero bits is appended to the second DCI and the payload size including the one or more zero bits of the second DCI is identified until the payload size including the one or more zero bits of the second DCI does not belong to one of the ambiguous sizes and the payload size including the one or more zero bits of the second DCI is not equal to a payload size of the first DCI based on a result of the identification.

6. The method of claim 5, wherein the ambiguous sizes comprise one of 12, 14, 16, 20, 24, 26, 32, 44, and 56 information bits.

7. The method of claim 5, wherein the first DCI comprises a DCI format 0 and a DCI format 1A and the second DCI comprises a DCI format 1, wherein at least one zero bit is appended to the DCI format 1A until the payload size of the DCI format 1A is equals the payload size of the DCI format 0 by the transmitter if a number of information bits in the DCI format 1A is less than a number of information bits in the DCI format 0, and wherein one zero bit is append to the DCI format 1A by the transmitter if the number of the information bits in the DCI format 1A belongs to one of the ambiguous sizes.

8. The method of claim 7, wherein at least one zero bit is appended to the DCI format 0 until the payload size of the DCI format 0 is equals the payload size of the DCI format 1A by the transmitter if the number of the information bits in the DCI format 0 is less than the payload size of the DCI format 1A.

9. A transmitting apparatus for generating downlink control information (DCI) in a communication system, the apparatus comprising:

a transmitter for transmitting a signal to a receiver; and a controller configured to:

identify information bits in a first DCI and information bits in a second DCI;

append one bit of value zero to the second DCI if a number of the information bits in the second DCI is equal to a number of the information bits in the second DCI;

append one or more zero bits to the second DCI, if the number of the information bits in the second DCI belongs to one of ambiguous sizes, identify a payload size including the one or more zero bits of the second DCI based on the ambiguous sizes and the payload size of the first DCI; and transmit the second DCI to a receiver, wherein the controller is further configured to append the one or more zero bits to the second DCI and to identify the payload size including the one or more zero bits to the second DCI until the payload size including the one or more zero bits of the second DCI does not belong to one of the ambiguous sizes and the payload size including the one or more zero bits of the second DCI is not equal to a payload size of the first DCI based on a result of the identification, and wherein the transmitted second DCI is received based on the payload size of the second DCI.

10. The apparatus of claim 9, wherein the ambiguous sizes comprise one of 12, 14, 16, 20, 24, 26, 32, 44, and 56 information bits.

11. The apparatus of claim 9, wherein the first DCI comprises a DCI format 0 and a DCI format 1A and the second DCI comprises a DCI format 1, and wherein the controller is further configured to append at least one zero bit to the DCI format 1A until the payload size of the DCI format 1A is equals the payload size of the DCI format 0 if a number of information bits in the DCI format 1A is less than a number of information bits in the DCI format 0 and to append one zero bit to the DCI format 1A if the number of the information bits in the DCI format 1A belongs to one of the ambiguous sizes.

12. The apparatus of claim 11, wherein the controller is further configured to append at least one zero bit to the DCI format 0 until the payload size of the DCI format 0 is equals the payload size of the DCI format 1A if the number of the information bits in the DCI format 0 is less than the payload size of the DCI format 1A.

13. A receiving apparatus for receiving control information in a communication system, the apparatus comprising:

receiving unit for receiving the control information comprising at least one of a first downlink control information (DCI) and a second DCI from a transmitter; and
controller configured to decode the control information based on a payload size of the received first DCI and a payload size of the received second DCI,
wherein one bit of value zero is appended to the second DCI by the transmitter if a number of information bits in the second DCI is equal to a number of information bits in the first DCI, and
wherein one or more zero bits is appended to the second DCI by the transmitter, if the number of the information bits in the second DCI belongs to one of ambiguous sizes, and the payload size including the one or more zero bits of the second DCI is identified by the transmitter based on the ambiguous sizes and the payload size of the first DCI, and
wherein the one or more zero bits is appended to the second DCI and the payload size including the one or more zero bits of the second DCI is identified until a payload size including the one or more zero bits of the second DCI does not belong to one of the ambiguous sizes and the payload size including the one or more zero bits of the second DCI is not equal to a payload size of the first DCI based on a result of the identification.

14. The apparatus of claim 13, wherein the ambiguous sizes comprise one of 12, 14, 16, 20, 24, 26, 32, 44, and 56 information bits.

15. The apparatus of claim 13, wherein the first DCI comprises a DCI format 0 and a DCI format 1A and the second DCI comprises a DCI format 1, wherein at least one zero bit is appended to the DCI format 1A until the payload size of the DCI format 1A is equals the payload size of the DCI format 0 by the transmitter if a number of information bits in the DCI format 1A is less than a number of information bits in the DCI format 0, and wherein one zero bit is append to the DCI format 1A by the transmitter if the number of the information bits in the DCI format 1A belongs to one of the ambiguous sizes.

16. The apparatus of claim 15, wherein at least one zero bit is appended to the DCI format 0 until the payload size of the DCI format 0 is equals the payload size of the DCI format 1A by the transmitter if the number of the information bits in the DCI format 0 is less than the payload size of the DCI format 1A.

* * * * *

UNITED STATES PATENT AND TRADEMARK OFFICE
CERTIFICATE OF CORRECTION

| | |
|---|---|
| PATENT NO. | : 9,461,856 B2 |
| APPLICATION NO. | : 12/610849 |
| DATED | : October 4, 2016 |
| INVENTOR(S) | : Jin Kyu Han et al. |

It is certified that error appears in the above-identified patent and that said Letters Patent is hereby corrected as shown below:

In Column 17, Line 49 Claim 5, "DCL" should be -- DCI --

Signed and Sealed this
Nineteenth Day of June, 2018

Andrei Iancu
*Director of the United States Patent and Trademark Office*